(12) United States Patent
Schat (10) Patent No.: US 11,943,015 B2
(45) Date of Patent: Mar. 26, 2024

(54) COMMUNICATIONS SYSTEM

(71) Applicant: NXP B.V., Eindhoven (NL)

(72) Inventor: Jan-Peter Schat, Hamburg (DE)

(73) Assignee: NXP B.V., Eindhoven (NL)

( * ) Notice: Subject to any disclaimer, the term of this patent is extended or adjusted under 35 U.S.C. 154(b) by 194 days.

(21) Appl. No.: 17/449,759

(22) Filed: Oct. 1, 2021

(65) Prior Publication Data
US 2022/0140867 A1    May 5, 2022

(30) Foreign Application Priority Data
Oct. 30, 2020  (EP) .................................... 20204972

(51) Int. Cl.
*H04B 7/06* (2006.01)
*H04B 7/0452* (2017.01)

(52) U.S. Cl.
CPC ......... *H04B 7/0452* (2013.01); *H04B 7/0682* (2013.01)

(58) Field of Classification Search
None
See application file for complete search history.

(56) References Cited

U.S. PATENT DOCUMENTS

| 2007/0172078 A1* | 7/2007 | Beguet ..................... G03H 3/00 381/92 |
|---|---|---|
| 2009/0290657 A1 | 11/2009 | Howard et al. |
| 2014/0112667 A1 | 4/2014 | Neukirch et al. |
| 2018/0048063 A1 | 2/2018 | Hallivuori |

OTHER PUBLICATIONS

Chen et al.: "Original Symbol Phase Rotated Secure Transmission Against Powerful massive MIMO Eavesdropper," accepted Jun. 7, 2016, date of publication Jun. 14, 2016, date of current version Jul. 7, 2016, Digital Object Identifier 10.1109/ACCESS.2016.2580673, IEEE Access, Special Section on Green Communications and Networking for 5G Wireless, vol. 4, 2016, pp. 3016-3025.
Debbah et al. "Wireless Physical Layer Security", Hindawi Publishing Corporation, EURASIP Journal onWireless Communications and Networking, vol. 2009, Article ID 404061, doi:10.1155/2009/404061, pp. 1-2.
Nguyen et al.: "Secure Massive MIMO With the Artificial Noise-Aided Downlink Training," IEEE Journal on Selected Areas in Communications, vol. 36, No. 4, Apr. 2018, pp. 802-816.
Ya: "Radiation and Reception of the Short Signals by the Long Antennas," Ultrawideband and Ultrashort Impulse Signals, Sep. 6-10, 2010, Sevastopol, Ukraine, 978-1-4244-7468-4/10/$26 © 2010 IEEE, pp. 40-44.
Zhang et al.: "An Experimental Study on Indoor Massive 3DMIMO Channel at 30-40 GHz Band," 2018 International Symposium on Antennas and Propagation (ISAP), Oct. 23-26, 2018, IEEE, Busan, Korea (South), pp. 1-2.

\* cited by examiner

*Primary Examiner* — Minh Trang T Nguyen (57) ABSTRACT

A communications system (300) comprising: an antenna (320) that comprises a plurality of serially connected sub-antenna elements (322); and a signal generator (324) configured to provide a transmission signal to the antenna (320) for propagating along the sub-antenna elements (322). The transmission signal comprises a plurality of serial symbol packets. The signal generator (324) is configured to set the phase of the serial symbol packets such that when they align with predefined ones of the sub-antenna elements (322) the antenna (322) provides a beamformed signal.

20 Claims, 5 Drawing Sheets

COMMUNICATIONS SYSTEM

CROSS-REFERENCE TO RELATED APPLICATIONS

This application claims the priority under 35 U.S.C. § 119 of European Patent application no. 20204972.2, filed on 30 Oct. 2020, the contents of which are incorporated by reference herein.

FIELD

The present disclosure relates to communications systems. In particular, to communications systems that have an antenna for providing a directional beamformed signal.

SUMMARY

According to a first aspect of the present disclosure there is provided a communications system comprising:
   an antenna that comprises a plurality of serially connected sub-antenna elements; and
   a signal generator configured to provide a transmission signal to the antenna for propagating along the sub-antenna elements, wherein the transmission signal comprises a plurality of serial symbol packets, and wherein the signal generator is configured to set the phase of the serial symbol packets such that when they align with predefined ones of the sub-antenna elements the antenna provides a beamformed signal.

Such a system can advantageously require standard RF transmitter hardware—one amplifier, one antenna—yet still offer the advantages of massive MIMO that include narrow beamforming. This can save energy, allow addressing many user devices by a single base station, and reduce the cost and complexity of the system.

In one or more embodiments, the signal generator comprises a phase adjustment block configured to:
   receive a symbol;
   receive a position indicator for a designated receiver;
   for each of the serially connected sub-antenna elements:
      determine a serial symbol packet based on the received symbol, and set the phase of the serial symbol packet based on the received position indicator; and
   provide the serial symbol packets to the antenna as the transmission signal.

In one or more embodiments, each symbol packet is configured to be aligned with a single one of the plurality of sub-antenna elements in order to contribute to the beamformed signal.

In one or more embodiments, the communications system further comprises a single driver that is configured to drive each of the sub-antenna elements of the antenna with the transmission signal.

In one or more embodiments, each symbol packet represents one or a plurality of carrier frequency wavelets.

In one or more embodiments, the antenna comprises multiple segments that are not parallel with each other. Each segment can include a plurality of sub-antenna elements.

In one or more embodiments, the system comprises a plurality of antennas, which each comprises a plurality of serially connected sub-antenna elements.

The signal generator may be configured to provide a transmission signal to each of the plurality of the antennas for propagating along the sub-antenna elements, such that each of the plurality of antennas provides a beamformed signal that is directed to the same designated receiver.

In one or more embodiments, the system is configured to determine a respective antenna-specific-position-indicator for each of the plurality of antennas based on a known position of the sub-antenna elements.

For each of the plurality of antennas:
   for each of the serially connected sub-antenna elements:
      the system can determine a serial symbol packet based on a received symbol, and set the phase of the serial symbol packet based on the respective antenna-specific-position-indicator.

The system can provide the serial symbol packets to the antenna as the transmission signal.

In one or more embodiments, the signal generator is configured to add noise to the transmission signal that is provided to the antenna.

In one or more embodiments, the plurality of sub-antenna elements are asymmetrically provided.

In one or more embodiments, at least one of the sub-antenna elements has a different length to another of the sub-antenna elements.

In one or more embodiments, at least one of the symbol packets has a different duration to another of the symbol packets.

In one or more embodiments, the system is for wireless data transmission.

In one or more embodiments, the system comprises one or more delay elements or resonators between successive sub-antenna elements.

There is also disclosed a method of providing a transmission signal to an antenna that comprises a plurality of serially connected sub-antenna elements, the method comprising:
   receiving a symbol;
   receiving a position indicator for a designated receiver;
   determining the transmission signal by:
      for each of the serially connected sub-antenna elements:
         determining a serial symbol packet based on the received symbol, and
         setting the phase of the serial symbol packet based on the received position indicator, such that when the symbol packets align with predefined ones of the sub-antenna elements the antenna provides a beamformed signal directed at the designated receiver; and
   providing the serial symbol packets to the antenna serially as the transmission signal.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

BRIEF DESCRIPTION OF THE DRAWINGS

One or more embodiments will now be described by way of example only with reference to the accompanying drawings in which.

DETAILED DESCRIPTION

Massive MIMO (Multiple Input, Multiple Output) technology is used for advanced transmission standards like the 5G mobile communication standard. It can offer narrow beam forming (that is, well-directed narrow transmit and receive beams), and hence the possibility to address many user devices per base station. It can also offer a way to defer attacks on the security of the transmitted messages.

Massive MIMO is based on a large number, e.g. several hundred, of different power amplifiers and antennas. This is suitable for 5G base stations, but may be too much overhead for applications in which a similar degree of secure authentication is required or desired—e.g. domestic WLAN stations, WLAN hot spots, vehicle-to-everything (V2X) base stations, micro-cell base stations in future cellular network transmission standards or domestic cordless phone base stations.

Examples disclosed herein can extend and modify the massive MIMO concept from several hundreds of small antennas to one single, long antenna which consists of a concatenation of many small sub-antennas. As will be described in detail below, the intended signal for these sub-antennas is sequentially fed into the long antenna; due to propagation delay, at a certain point of time, the intended signal is present at each sub-antenna and the single, long antenna transmits a directional beamformed signal.

Such a system can require standard RF transmitter hardware—one amplifier, one antenna—yet still offer the advantages of massive MIMO that include narrow beamforming. This can save energy and allow addressing many user devices by a single base station. In this way, the cost and complexity of using many (perhaps several hundred) RF amplifiers is avoided.

An additional advantage is that one or more of the systems disclosed herein can be well suited for state-of-the-art ways of Physical Layer Security to protect a secure authentication.

Target applications can therefore include secure authentication by low data-rate cryptographic challenge/response handshake. The systems can be used stand-alone, or in additional to existing security/authentication methods.

Figure 1:
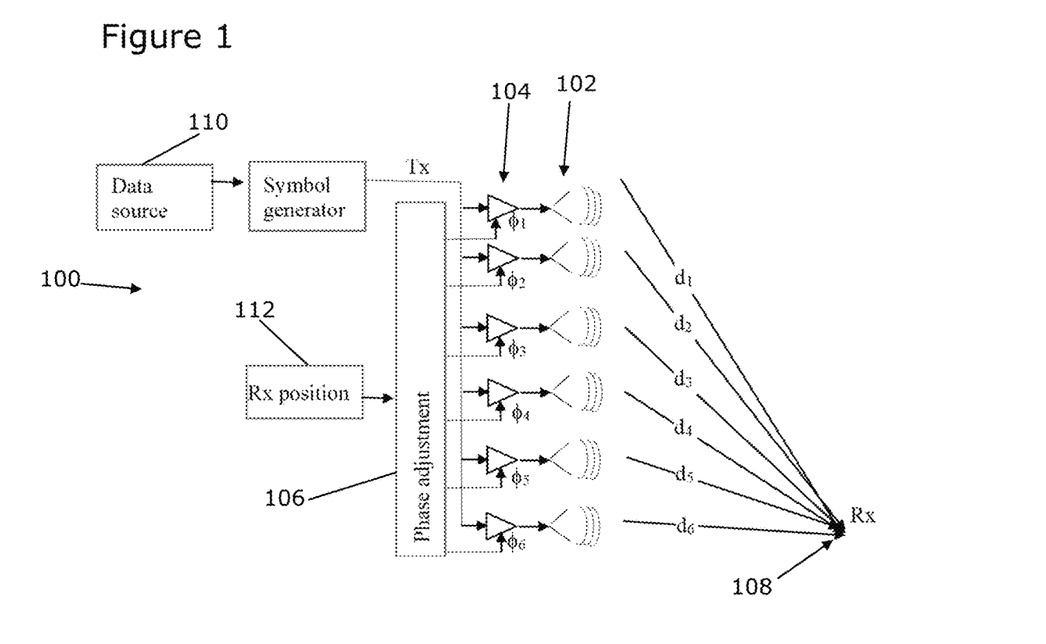
FIG. 1 shows a simplified MIMO system, in which a symbol is transmitted via several antennas.

FIG. 1 shows a simplified MIMO system 100, in which signals that represent a symbol (e.g. one bit modulated on an RF carrier frequency) are transmitted via several antennas 102. The system 100 includes a driver/amplifier 104 for each antenna 102. A phase adjustment block 106 sets the phase $\phi n$ of each driver/amplifier 104 such that at a known position of a receiver 108, the signals transmitted from the antennas 102 superimpose constructively. That is, the phase adjustment block 106 sets the relative phase shift of the drivers/amplifiers 104 to provide beamforming in a required direction.

In FIG. 1, a data source 110 creates data words that are to be transmitted by the antennas 102. For example, each data word can be 10 bits wide for a 1024-QAM (quadrature amplitude modulation) signal. Further details of such signals will be described below with reference to FIGS. 6a and 6b.

The phase adjustment block 106 receives a position indicator 112 that describes the position of the designated receiver 108. It will be appreciated that the phase adjustment block 106 can receive the position indicator 112 from a processing block/module that is internal to the MIMO system 100 or external from the MIMO system. The position indicator 112 can be determined by processing a signal that is received from the designated receiver 108. Also, the position indicator 112 can be retrieved from memory, for instance in environments where the antennas 102 and designated receiver 108 are in fixed positions (such as an office or manufacturing environment).

The phase adjustment block 106 then calculates, according to the position of designated receiver 108 as defined by the position indicator 112, a setting $\phi_n$ for a phase shifter of each driver/amplifier 104. The phase shifter settings $\phi n$ result in each antenna 102 transmitting a signal with a phase such that at the designated receiver 108, the field strength is expected to be at its maximum. This is because (ideally) the signals transmitted by each of the antennas 102 interfere constructively at that point.

Assuming far-field conditions, the complex amplitude $V_{Rx}$ received at the position of the receiver 108 as shown in FIG. 1 can be calculated as a function of the distances d(n) from antenna 102 to the designated receiver 108, and the carrier frequency's wavelength λ. For convenience, the transmit power as well as the transmission factor from antenna to the designated receiver 108 are assumed to be unity.

$$V_{Rx} = \sum_n e^{-\frac{jd(n)}{\lambda}}$$

The MIMO system 100 of FIG. 1 can be used for narrow beamforming. A significant drawback is the huge number of components and associated Bill of Material (BOM) due to the large number of drivers/amplifiers 104 and antennas 102. This holds especially for the massive MIMO used e.g. in the 5G cellular network transmission standard.

Figure 2:
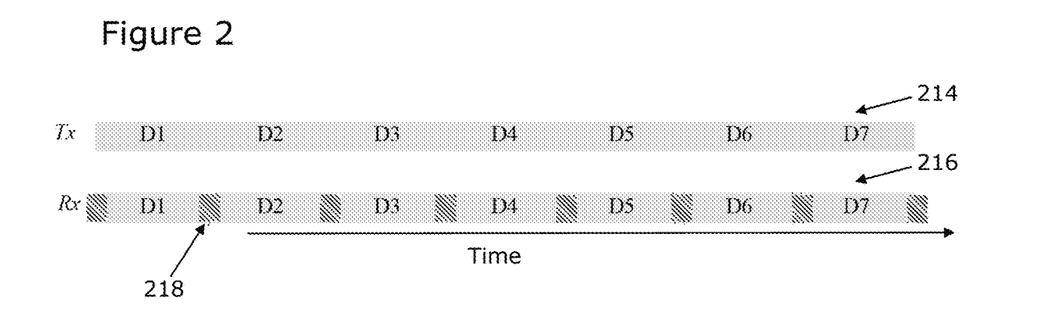
FIG. 2 shows a transmitted signal Tx with the different symbols D1 . . . D7 that are sequentially transmitted by the MIMO system of FIG. 1, and also shows the corresponding received signal at the designated receiver.

FIG. 2 shows a transmitted signal Tx 214 with the different symbols D1 . . . D7 that are sequentially transmitted by the MIMO system of FIG. 1. FIG. 2 also shows the received signal Rx 216 with the respective symbols as received at the designated receiver in FIG. 1. As can be seen, there is only a short time interval between the received symbols, when the received symbol is undefined (marked by the striped boxes 218).

Figure 3:
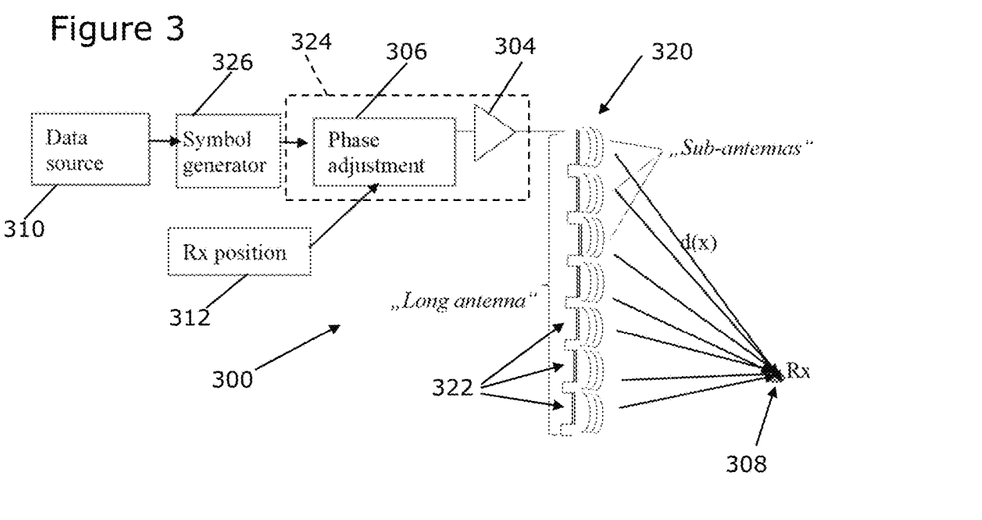
FIG. 3 shows an example embodiment of a communications system, which includes an antenna that comprises a plurality of serially connected sub-antenna elements.

FIG. 3 shows an example embodiment of a communications system 300, which, as described below, provides similar functionality to the MIMO system that is shown in FIG. 1. The example of FIG. 3 can be referred to as a space-continuous MIMO system.

The system 300 includes an antenna 320 that comprises a plurality of serially connected sub-antenna elements 322. In the example of FIG. 3 there are seven sub-antenna elements 322, although it will be appreciated that any number of sub-antenna elements 322 can be used. The sub-antenna elements 322 can be considered as part of a single "long antenna" that replaces the multiple small antennas 102 that are shown in FIG. 1. Such examples can be considered as having a "long" antenna because it is longer than would be required for a single antenna (one that does not have a plurality of sub-antenna elements) to transmit signals at the same frequency.

The system 300 also includes a signal generator 324 that provides an electrical transmission signal to the antenna 320 for propagating along the sub-antenna elements 322.

Each sub-antenna element 322 has a proximal and distal end—the proximal end being electrically closest to a signal generator 324 that provides the transmission signal; and the distal end being electrically furthest away from the signal generator 324. Therefore, a sub-antenna element 322 receives the transmission signal at its proximal end, the transmission signal propagates through the sub-antenna element 322 towards its distal end, and then the transmission signal exits the sub-antenna element 322 at its distal end. The sub-antenna elements 322 are connected serially in that the distal end of a sub-antenna element is galvanically connected in series to the proximal end of the next sub-antenna element in the series.

The transmission signal comprises a plurality of serial symbol packets (not shown in FIG. 3) each with a defined phase such that when the serial symbol packets align with predefined ones of the sub-antenna elements 322, the specified phase shifts cause the antenna 320 to provide a beamformed signal. The data in each symbol packet can be configured to be aligned with a single one of the plurality of sub-antenna elements 322, in order to contribute to the beamformed signal that is provided by the antenna 320. When a symbol packet is not aligned with its predefined sub-antenna element 322, it does not contribute to a beamformed signal that is directed towards the designated receiver 308. In this way, the antenna 320 is serially fed with signals such that at some instants in time (due to the propagation delay in the antenna 320) each of the sub-antenna elements 322 receives a signal similar to the signal of the corresponding antenna of a multi-antenna array in FIG. 1. Therefore, the system 300 of FIG. 3 can achieve a transmission pattern that is similar to the MIMO system of FIG. 1 such that the respective signals constructively interfere at the intended position (the designated receiver position 308) at a designated time.

As shown in FIG. 3, the signal generator 324 receives a symbol from a symbol generator 326. The symbol generator 326, in turn, receives data from a data source 310 and generates the symbols according to any method known in the art. The symbols can simply be bits in some examples. In other examples, as described below, the symbols may be QAM symbols.

The signal generator 324 includes a phase adjustment block 306, which is different to the corresponding block in the system of FIG. 1. In FIG. 1 the phase adjustment block provides phase values to each of the drivers/amplifiers in parallel with each other, and the phase shift of each driver/amplifier stays constant during the transmission of each symbol. Whereas the phase adjustment block 306 of FIG. 3 provides phase values for each of the sub-antenna elements 322 serially to the antenna 320 such that a plurality of different phase values are provided to the antenna 320 for the transmission of a single symbol.

The phase adjustment block 306 of FIG. 3 receives a symbol from the symbol generator 326, and also receives a position indicator 312. As above, the position indicator 312 can describe the position of the designated receiver 308 relative to the antenna 320. Then, for each of the serially connected sub-antenna elements 322, the phase adjustment block 306 determines a serial symbol packet based on the symbol received from the symbol generator 326.

The phase adjustment block 306 sets the phase of the serial symbol packet based on the received position indicator 312.

This description assumes, for ease of reading, that the difference in travel times from each sub-antenna element 322 to the designated receiver 308 is negligible. If this is not the case, then the phase adjustment block 306 can correct the phase of the symbol packets for the respective sub-antennas 322 to account for the travel time difference.

In this example, the signal generator 324 also includes a single driver/amplifier 304 that drives the entire antenna 320, and therefore also drives each of the sub-antenna elements 322. This is in contrast to the system of FIG. 1 that required a plurality of drivers/amplifiers.

The signal generator 324 (in this example, the driver/amplifier 304 of the signal generator 324) can then provide the serial symbol packets to the antenna 320.

Again assuming far-field conditions, the complex amplitude $V_{Rx}$ received at the position of the receiver 308 as shown in FIG. 3 can be calculated as a function of the distances d(n) and the wavelength $\lambda$. For convenience, the transmit power and the attenuation across the path from the antenna 320 to the designated receiver 308 are again assumed to be unity.

$$V_{Rx} = \sum_n e^{-\frac{jd(n)}{\lambda}}$$

Figure 4:
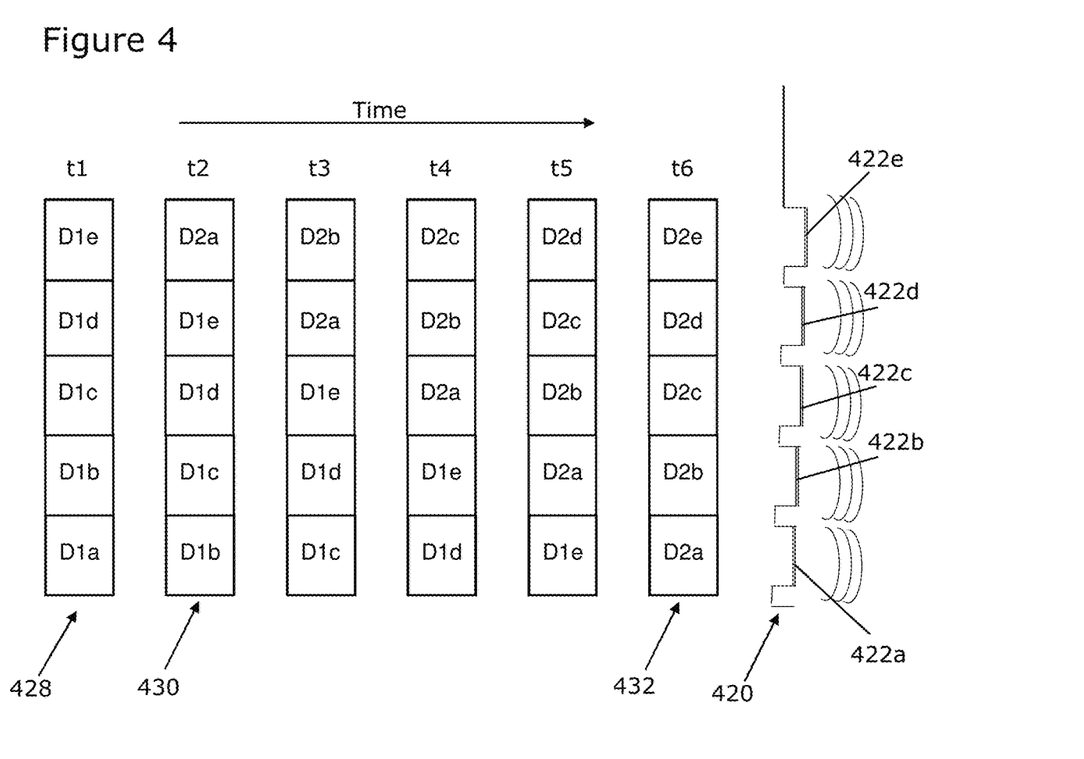
FIG. 4 shows schematically how an antenna that is similar to the antenna of FIG. 3 can be used to provide a beamformed signal.

FIG. 4 shows schematically how an antenna 420 that is similar to the antenna of FIG. 3 can be used to provide a beamformed signal. The antenna 420 of FIG. 4 includes five sub-antenna elements 422a-e. The left-hand side of FIG. 4 schematically shows six instances of a transmission signal that can be present on the antenna 420 at six instances in time, t1-t6, as the transmission signal propagates along the antenna.

At t1, the transmission signal 428 that is present on the antenna 420 includes five serial symbol packets, D1a-D1e, that are aligned with respective sub-antenna elements 422a-e of the antenna 420. The phase adjustment block of the system has set the phase of each of these five serial symbol packets, D1a-D1e, such that when they are aligned with the respective sub-antenna elements 422a-e the respective phase shifts causes the antenna to provide a beamformed signal that represents the first symbol, D1, and is directed to the designated receiver.

At time t2, the transmission signal 430 has propagated along the antenna 420 from t1 such that a newly received symbol packet, D2a, for a second symbol is now aligned with the first sub-antenna element 422e of the antenna 420. The symbol packets for the first symbol, D1, have propagated along the antenna 420 such that the first symbol packet, D1a, has dropped off the end of the antenna 420 (i.e., it has been absorbed by a termination resistor). The second packet for the first symbol, D1b, is therefore aligned with the last sub-antenna element 422a. At t2, the antenna 420 does not provide a complete beamformed signal directed to the designated receiver because the sub-antenna elements 422a-e receive symbol packets that relate to a mixture of symbols (D1 and D2) at t2.

At times t3 to t5, a newly received symbol packet for the second symbol, D2, is provided to the antenna 420 by the signal generator and is aligned with the first sub-antenna element 422e. Also, the earliest symbol packet for the preceding symbol drops off the end of the antenna 420 in the same way as described for t2.

At time t6, the last symbol packet, D1e, for the preceding symbol, D1, has dropped off the end of the antenna 420. Therefore, at t6 the transmission signal 432 that is present on the antenna 420 includes five serial symbol packets of the second symbol, D2a-D2e, that are aligned with respective sub-antenna elements 422a-e of the antenna 420. The phase adjustment block of the system has set the phase of each of these five serial symbol packets, D2a-D2e, such that when they are aligned with the respective sub-antenna elements 422a-e the respective phase shifts causes the antenna to provide a beamformed signal that represents the second symbol, D2, and is directed to the designated receiver.

In this way, the phase shift of the transmission signal fed into the antenna 420 varies during the symbol transmission. At one or more instants in time each sub-antenna element 422a-e gets its signal with the correct phase shift for a given symbol and the antenna 420 provides a beamformed signal. The antenna 420 can be considered as having a plurality of galvanically concatenated sub-antennas elements; with each sub-antenna element performing a similar function as a single antenna in the massive MIMO system of FIG. 1.

Each a symbol packet can represent one or a plurality of carrier frequency wavelets. It will be appreciated that the time between each of t1-t6 shown in FIG. 4 corresponds to the time it takes for a symbol packet to propagate along the antenna 420 from one sub-antenna element 422a-e to the next.

Figure 5:
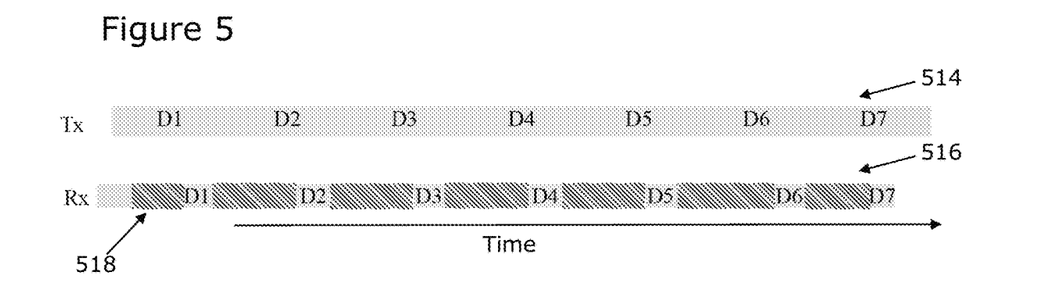
FIG. 5 shows a transmitted signal Tx with the different symbols D1 . . . D7 that are sequentially transmitted by the system of FIG. 3, and also shows the corresponding received signal at the designated receiver.

FIG. 5 shows a transmitted signal 514 Tx with the different symbols D1 . . . D7 that are sequentially transmitted by the system of FIG. 3. As will be appreciated from FIG. 4 in particular, each of the symbols includes a plurality of symbol packets that have a phase setting that is specific to that symbol packet for the given symbol, and is different to a phase setting for the symbol packets of the same symbol that are intended for the other sub-antenna elements. When each of the symbol packets of a given symbol are aligned with the appropriate sub-antenna elements, they have respective phase differences with the symbol packets on the other sub-antenna elements that results in constructive interference between the signals transmitted by the sub-antenna elements at the designated receiver position.

FIG. 5 also shows the received signal Rx 516 with the respective symbols as received at the designated receiver in FIG. 3. As can be seen, the received symbols are valid only for a very short time, and there is a relatively long time interval between adjacent symbols that are received at the designated receiver, where the symbol is undefined, as illustrated by the striped boxes 518. These periods of time that the symbol is undefined at the designated receiver are caused by the time taken for the symbol packets of the transmission signal to propagate along the antenna until they are correctly aligned with their intended sub-antenna elements. With reference to the example of FIG. 4, the symbol will be undefined at the designated receiver at times t2, t3, t4 and t5.

It will therefore be appreciated from FIGS. 4 and 5 that the system of FIG. 3 will reduce the achievable data rate, when compared with the system of FIG. 1. This is a compromise that results from the use of a single independent antenna having multiple sub-antenna elements. In some applications, the reduction in components and complexity when compared with the system of FIG. 1 can be a sufficiently strong benefit to warrant the trade-off with achievable data rate.

Furthermore, the reduced data rate can provide an advantage in that it can strongly increase the Physical Layer Security. This is because an attacker (who may also be referred to as an eavesdropper) has less time of signal validity. The attacker may not be able to readily derive the moment that a received signal is valid, especially if he/she does not know the intended location of the designated receiver, whereas a legitimate receiver can derive the moment when the signal is valid (as will be discussed in more detail below with reference to FIG. 7). Physical Layer Security can be advantageous in the context of protecting wireless communication from a mobile phone base station to user devices. In such applications, the phases of the symbol packets are modified in a way that is only known by the legitimate receiver, hence only the legitimate receiver can reconstruct the intended signal with its full amplitude. An attacker, who does not know how the phases of the symbol packets have been shifted, however, can only reconstruct a signal that is much below the ambient noise floor, and hence cannot be used to retrieve the desired information. In this way, the transmitted message can be protected with a security level that is comparable to state-of-the-art hard cryptography, e.g. RSA or AES encryption.

Therefore, examples disclosed herein can provide a niche-application for authentication. This may especially be the case in future transmission technologies (particularly those that use high-frequency signals, where the dimensions of the antenna can be kept small), for stand-alone technologies, or to synergistically complement other authentication mechanisms. Examples disclosed herein can be suitable for authentication/secure exchange of challenge/response words.

Figure 6A:
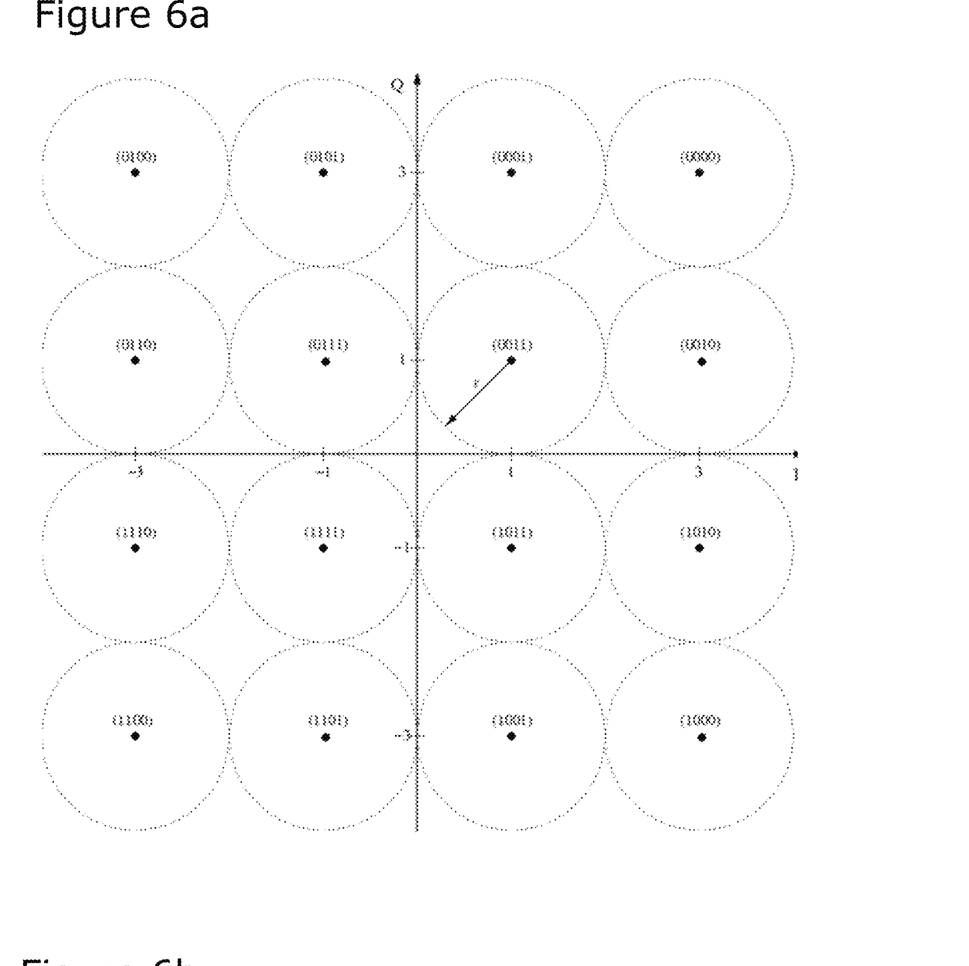
FIG. 6a shows a symbol in the context of a Quadrature Amplitude Modulation (QAM) transmission.

FIG. 6a shows a symbol in the context of a Quadrature Amplitude Modulation (QAM) transmission—the symbol has a certain amplitude for the I-component and an amplitude for the Q-component. Depending on the signal-to-noise ratio and the requirements for Bit Error Rate, a symbol can be approximately one carrier frequency wavelet long, or comprise several carrier wavelets. The combination of I and Q amplitudes encodes the intended data word; in advanced QAM coding schemes there may be e.g. $2^{10}$ or even $2^{12}$ different symbols, so that 10 or even 12 bits per symbol can be transferred.

QAM is identified as one example type of symbol because it includes many modulation schemes like Binary Phase Shift Keying (BPSK), Amplitude Shift Keying (ASK) or Amplitude Modulation (AM). Nonetheless, as indicated above, any type of symbol can be used in systems disclosed herein, with any type of modulation of encoding.

Figure 6B:
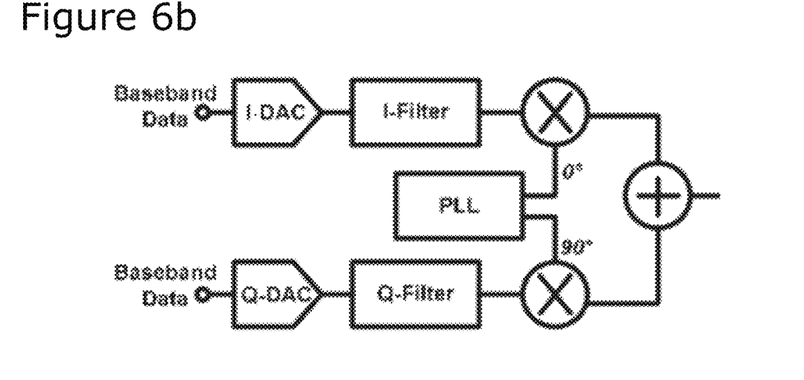
FIG. 6b shows an example symbol generator for QAM.

FIG. 6b shows an example symbol generator for QAM, that can be used as part of a communications system as disclosed herein. The data word to be transmitted is split into one half that is fed into the I-DAC, and another half that is fed into the Q-DAC. The data are converted to analog values, filtered and mixed with the original or 90° phase-shifted PLL-generated RF carrier signal, and finally they are added.

Figure 7:
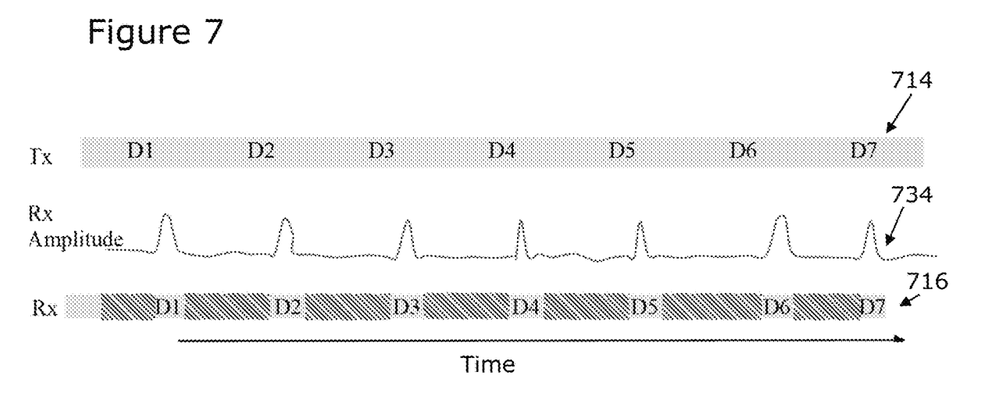
FIG. 7 shows the transmitted signal Tx and the corresponding received signal Rx of FIG. 5, and also the signal amplitude of the received signal RX.

FIG. 7 shows a transmitted signal 714 Tx and a corresponding received signal Rx 716 that are the same as shown in FIG. 5. As discussed above, each received symbol is valid for only a relatively short time compared with FIG. 2.

FIG. 7 also shows the signal amplitude 734 of the received signal RX 716 at the designated receiver. As can be seen from FIG. 7, the signal amplitude 734 is sufficiently high only for a short time interval, compared to the whole duration of each symbol. This is because the signals of the sub-antenna elements interfere constructively only in this short time interval. At all other times, the signal amplitude 734 is very low; at these times, the signals from the sub-antenna elements interfere constructively and destructively. This allows for a mechanism to synchronize the receiver to this short interval of validity. One way to achieve such a synchronization is using a standard PLL mechanism. As the symbol rate is assumed to be fixed and constant, the frequency range of the PLL's VCO can and should be relatively narrow.

Turning now to the antenna, it will be appreciated that it can be implemented in any of a number of different ways in order to provide the plurality of sub-antenna elements that are described herein. It could simply be a single wire (which may or may not be orientated in a straight line), with the sub-antenna elements being defined as particular regions of the wire. The sub-antenna elements may be spaced apart along the antenna, or they may be defined as adjacent regions of the antenna. The antenna may optionally be provided with delay elements or resonators between successive sub-antenna elements. Depending on the carrier frequency, these can be implemented as a simple delay line (high frequency), or e.g. an inductor (lower frequency). An advantage of including this functionality is that the symbol at each sub-antenna element can "stay" there for a longer time, before it starts propagating into the next sub-antenna element.

The appropriate design of the antenna/sub-antenna elements will depend on factors such as carrier frequency and the intended range of the signals to be transmitted by the antenna (e.g. in the 1 km range for telecom applications, but only in the 10 m range for in-house wireless networks). The antenna may be a continuous single wire or a dipole antenna. The antenna and/or sub-antenna elements may also be realized in stripline or microstrip/microstrip patch technology. For very short wavelengths, it may also be realized in antenna-in-package technology, i.e. integrated into the ICs package. For achieving a high antenna efficiency, a resonant antenna can be particularly well-suited.

Figure 8:
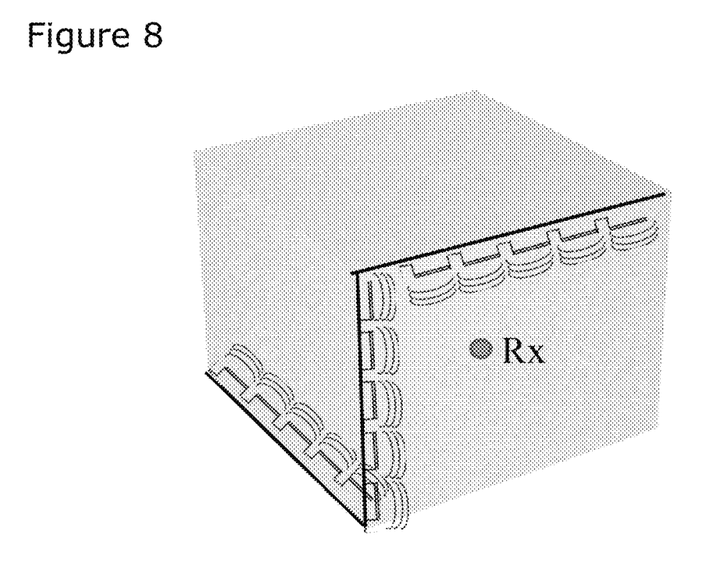
FIG. 8 shows an example embodiment of an antenna consisting of three orthogonal segments, which can be used for 3D beamforming.

FIG. 8 shows an example embodiment of an antenna consisting of three orthogonal segments, which can be used for 3D beamforming.

In this example, the antenna is provided as a wire, but not orientated in a straight line (on which the sub-antennas are lined up). Instead, the antenna is divided into multiple segments that are not parallel with each other. For instance, the segments can be orthogonal to each other. In this example, the antenna includes three mutually orthogonal segments. Each segment can include a plurality of sub-antenna elements. This can allow for a better 3D beamforming, i.e. narrower transmit and receive lobes, with the advantage of higher security (as discussed above). Examples disclosed herein can also consume lower energy than systems known in the art. This is because the transmit lobe can be narrower, and hence the transmit energy is concentrated in a smaller cross section.

One or more of the systems disclosed herein can be implemented using a plurality of antennas, with each antenna comprising a plurality of sub-antenna elements. Such systems can include a signal generator that is configured to provide a transmission signal to each of the plurality of the antennas for propagating along the sub-antenna elements, such that each of the plurality of antennas provides a beamformed signal that is directed to the same designated receiver.

Figure 9:
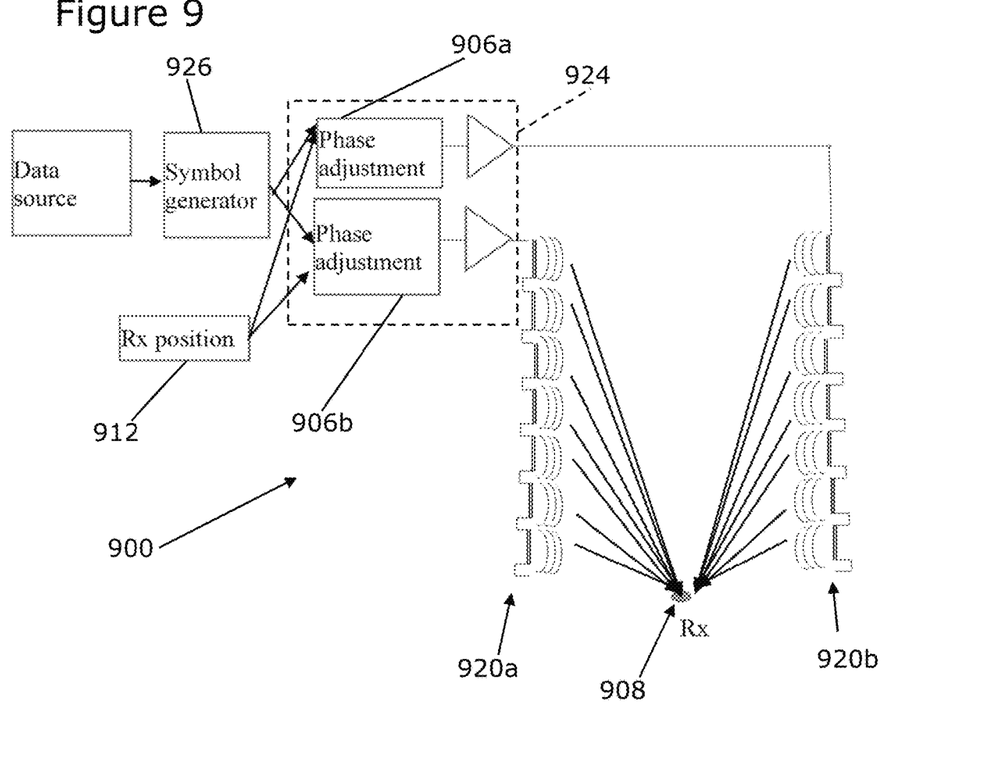
FIG. 9 shows an example embodiment of a communications system in which two antennas are used.

FIG. 9 shows an example embodiment of a communications system 900 in which two antennas 920a, 920b are used instead of only one. Although it will be appreciated that any number of antennas 920a, 920b can be used to suit a particular application. For instance, 3, 5, 10 or more antennas 920a, 920b can be used as part of the same communications system. Using a plurality of antennas 920a, 920b can provide substantially better beamforming, and thus higher security and lower transmit energy.

As shown in FIG. 9, the system 900 includes a signal generator 924 that has a plurality of phase adjustment blocks 906a, 906b. Each of the phase adjustment blocks 906a, 906b receives the same symbol, in this example from the same symbol generator 926. Each phase adjustment block 906a, 906b also receives a position indicator 912 that represents that same position in space of a designated receiver. In some examples, each phase adjustment block 906a, 906b may receive a position indicator 912 that represents a relative direction to the designated receiver from the respective antenna 920a, 920b. In such examples, the position indicators 912 that are provided to each phase adjustment block 906a, 906b will be different because their respective antennas will be in different positions with respect to the designated receiver.

In another example, each phase adjustment block 906a, 906b can receive the same position indicator 912 that represents a point in space of the designated receiver; for instance relative to a predetermined reference point, or using any known coordinate system such as GPS. In such examples, the phase adjustment block 906a, 906b can determine an antenna-specific-position-indicator for the respective antenna based on the known position of the sub-antenna elements, such that the antenna-specific-position-indicator can be used by the phase adjustment block 906a, 906b to set the phase of the symbol packets that will be provided to that antenna to achieve the required beamforming direction.

In a yet further example, any of the signal generators disclosed herein can add noise to the transmitted signal that is provided to the antenna, such as artificial pseudo-random noise or true random noise (e.g. thermal noise). This can provide an additional degree of Physical Layer Security because it can be more difficult for an eavesdropper to identify the transmitted signal.

In a yet further example, the sub-antenna elements of any of the systems described herein could be asymmetric with respect to each other. For instance, the sub-antenna elements do not necessarily need to all have the same length. Therefore, the symbol packets also do not necessarily all need to have the same duration. That is, at least one of the sub-antenna elements can have a different length to another of the sub-antenna elements, and at least one of the symbol packets can have a different duration to another of the symbol packets. Such an example can make it even more difficult for an eavesdropper to intercept the symbols if he/she does not have details of the asymmetry that is present in the sub-antenna elements and the symbol packets. Whereas an intended receiver would have details of the asymmetry, and therefore would be able to accurately decode the symbols from the received signal.

Figure 10:
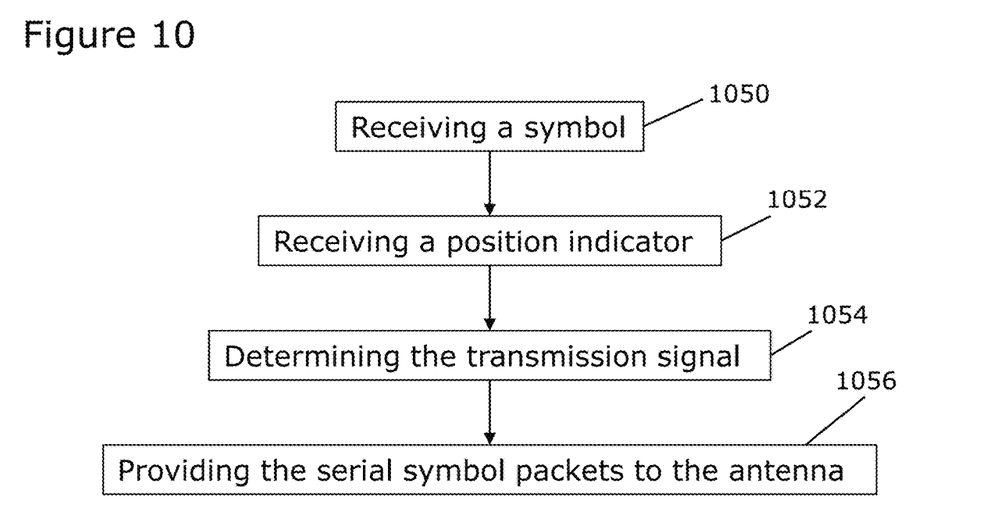
FIG. 10 shows schematically an example embodiment of a method according to the present disclosure.

FIG. 10 shows schematically an example embodiment of a method according to the present disclosure. The method is for providing a transmission signal to an antenna that comprises a plurality of serially connected sub-antenna elements. The method can be performed by any of the signal generators disclosed herein.

At step 1050, the method includes receiving a symbol, for example from a symbol generator. At step 1052, the method receives a position indicator for a designated receiver, as described above.

At step 1054, the method determines the transmission signal by: for each of the serially connected sub-antenna elements: (i) determining a serial symbol packet based on the received symbol, and (ii) setting the phase of the serial symbol packet based on the received position indicator. The method sets the phase such that when the symbol packets align with predefined ones of the sub-antenna elements, the antenna provides a beamformed signal.

At step 1056, the method provides the serial symbol packets to the antenna serially as the transmission signal.

Examples disclosed herein relate to a massive MIMO data transmission system that uses an antenna that includes many sub-antennas, which are functionally similar to the individual antennas used in the massive MIMO system of FIG. 1. These examples can be particularly well-suited for low data rate transmission of secure authentication messages, especially challenge/response words. Advantageously, such examples provide at least the high degree of Physical Layer Security as is achieved by a massive MIMO such as the one of FIG. 1, and the same high degree of beamforming, but with a substantially reduced bill of materials and fewer components.

Applications of the examples disclosed herein include integrated circuits (ICs) and systems for wireless data transmission, especially if the advantages of massive MIMO are beneficial (high directivity of the transmit/receive lobe, hence a high energy efficiency, efficiency of the used bandwidth, and additionally Physical Layer Security), and the additional advantage of space-continuous MIMO shall be used (reduced BOM). Particularly suitable applications include secure networks, e.g. domestic WLAN stations, WLAN hot spots, vehicle-to-everything (V2X) base stations, micro-cell base stations in future cellular network transmission standards or domestic cordless phone base stations, body-area networks, point-to-point connections similar to Bluetooth, Home IoT networks similar to ZigBee, etc.

Examples disclosed herein are suitable for use in a high frequency technology standard for mobile telecommunications. For instance, standards that operate at 60 GHz, 90 GHz, 100 GHz or even higher. At such frequencies the required lengths for the sub-antenna elements can be sufficiently small to provide 2 or 3 carrier frequency wavelets for each sub-antenna element, while still, achieving an overall antenna length that will not be too long for many applications.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/ method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:
1. A communications system comprising:
an antenna that comprises a plurality of serially connected sub-antenna elements; and
a signal generator configured to provide a transmission signal to the antenna for propagating along the sub-antenna elements, wherein the transmission signal comprises a plurality of serial symbol packets, and wherein the signal generator is configured to set the phase of the serial symbol packets such that when they align with predefined ones of the sub-antenna elements the antenna provides a beamformed signal.

2. The communications system of claim 1, wherein the signal generator comprises a phase adjustment block configured to:
receive a symbol;
receive a position indicator for a designated receiver;
for each of the serially connected sub-antenna elements: determine a serial symbol packet based on the received symbol, and set the phase of the serial symbol packet based on the received position indicator; and
provide the serial symbol packets to the antenna as the transmission signal.

3. The communications system of claim 1, wherein each symbol packet is configured to be aligned with a single one of the plurality of sub-antenna elements in order to contribute to the beamformed signal.

4. The communications system of claim 1, further comprising a single driver that is configured to drive each of the sub-antenna elements of the antenna with the transmission signal.

5. The communications system of claim 1, wherein each symbol packet represents one or a plurality of carrier frequency wavelets.

6. The communications system of claim 1, wherein the antenna comprises multiple segments that are not parallel with each other, wherein each segment includes a plurality of sub-antenna elements.

7. The communications system of claim 6, wherein the multiple segments are orthogonal to each other.

8. The communications system of claim 1, wherein the system comprises:
a plurality of antennas, which each comprises a plurality of serially connected sub-antenna elements; and
the signal generator is configured to provide a transmission signal to each of the plurality of the antennas for propagating along the sub-antenna elements, such that each of the plurality of antennas provides a beamformed signal that is directed to the same designated receiver.

9. The communications system of claim 8, wherein:
the system is configured to determine a respective antenna-specific-position-indicator for each of the plurality of antennas based on a known position of the sub-antenna elements; and
for each of the plurality of antennas:
for each of the serially connected sub-antenna elements: determine a serial symbol packet based on a received symbol, and set the phase of the serial symbol packet based on the respective antenna-specific-position-indicator; and
provide the serial symbol packets to the antenna as the transmission signal.

10. The communications system of claim 1, wherein the signal generator is configured to add noise to the transmission signal that is provided to the antenna.

11. The communications system of claim 10, wherein the noise comprises as artificial pseudo-random noise or true random noise.

12. The communications system of claim 1, wherein the plurality of sub-antenna elements are asymmetrically provided.

13. The communications system of claim 12, wherein at least one of the sub-antenna elements has a different length to another of the sub-antenna elements.

14. The communications system of claim 12, wherein at least one of the symbol packets has a different duration to another of the symbol packets.

15. The communications system of claim 1, wherein the system is for wireless data transmission.

16. The communications system of claim 1, wherein the system comprises one or more delay elements or resonators between successive sub-antenna elements.

17. A vehicle-to-everything base station comprising the communications system of claim 1.

18. A method of providing a transmission signal to an antenna that comprises a plurality of serially connected sub-antenna elements, the method comprising:
receiving a symbol;
receiving a position indicator for a designated receiver;
determining the transmission signal by:
for each of the serially connected sub-antenna elements:
determining a serial symbol packet based on the received symbol, and
setting the phase of the serial symbol packet based on the received position indicator, such that when the symbol packets align with predefined ones of the sub-antenna elements the antenna provides a beamformed signal directed at the designated receiver; and
providing the serial symbol packets to the antenna serially as the transmission signal.

19. The method of claim 18, further comprising:
receiving a symbol;
receiving a position indicator for a designated receiver;
for each of the serially connected sub-antenna elements: determining a serial symbol packet based on the received symbol, and setting the phase of the serial symbol packet based on the received position indicator; and
providing the serial symbol packets to the antenna as the transmission signal.

20. The method of claim 18, wherein each symbol packet is configured to be aligned with a single one of the plurality of sub-antenna elements in order to contribute to the beamformed signal.

* * * * *